United States Patent

[11] 3,557,970

| [72] | Inventor | Otto Niepmann<br>Gevelsberg, Westphalia, Germany |
| [21] | Appl. No. | 745,481 |
| [22] | Filed | July 17, 1968 |
| [45] | Patented | Jan. 26, 1971 |
| [73] | Assignee | Maschinenfabrik Fr. Niepmann & Co.<br>Gevelsberg, Westphalia, Germany |
| [32] | Priority | July 18, 1967 |
| [33] | | Germany |
| [31] | | M 74 803 |

[54] APPARATUS FOR WITHDRAWING PACKAGES FROM A CONTINUOUSLY CIRCULATING CONVEYOR CHAIN
3 Claims, 3 Drawing Figs.

[52] U.S. Cl. .................................................. 214/1,
214/6, 294/64
[51] Int. Cl. .................................................. B65g 57/30
[50] Field of Search.......................................... 214/1BS,
1BS2, 1BS3, 1BS4, 6.2, 8.5D, 650SG; 294/64, 65

[56] References Cited
UNITED STATES PATENTS
2,224,975  12/1940  McNamara................. 214/1(BS3)
2,858,009  10/1958  Bainbridge................. 214/1(BS2)X
2,359,432  10/1944  McNamara................. 214/1(BS3)
FOREIGN PATENTS
1,180,918  10/1961  Germany..................... 294/64

Primary Examiner—Gerald M. Forlenza
Assistant Examiner—George F. Abraham
Attorney—Walter Becker

ABSTRACT: A device for withdrawing packages of soft material with easily crushed articles therein, in which the respective package conveyed by a conveyor is picked up by suction pipe means, preferably located on both sides of the conveyor. The suction pipe means are provided with suction holes through which a suction effect is exerted upon the package so as to hold the package by means of the suction effect whereupon the suction pipe means is moved to a depositing area where the suction effect exerted by the suction pipe means upon the package is eliminated so that the package is released and by corresponding transfer means is conveyed to a storage place or the like.

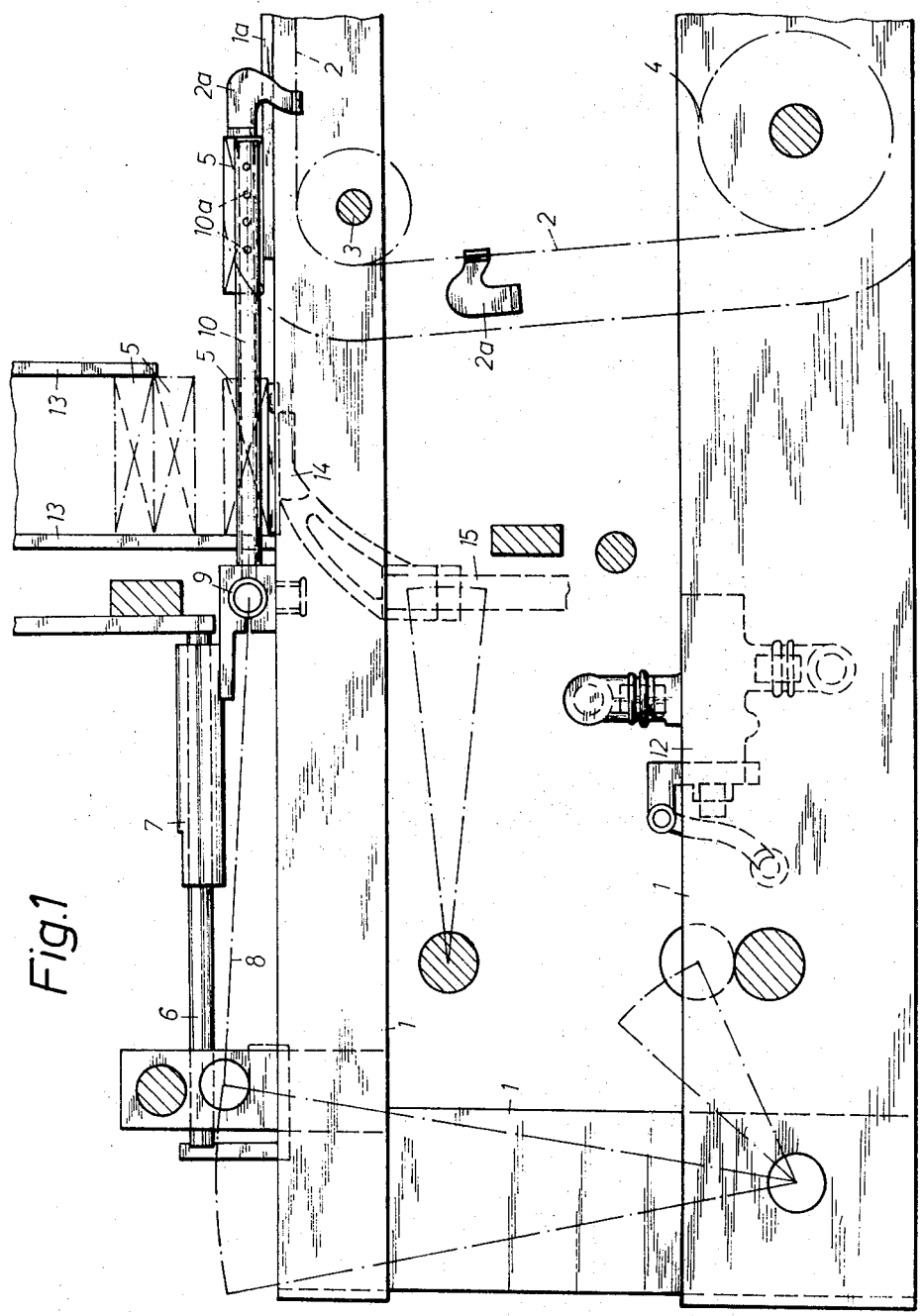

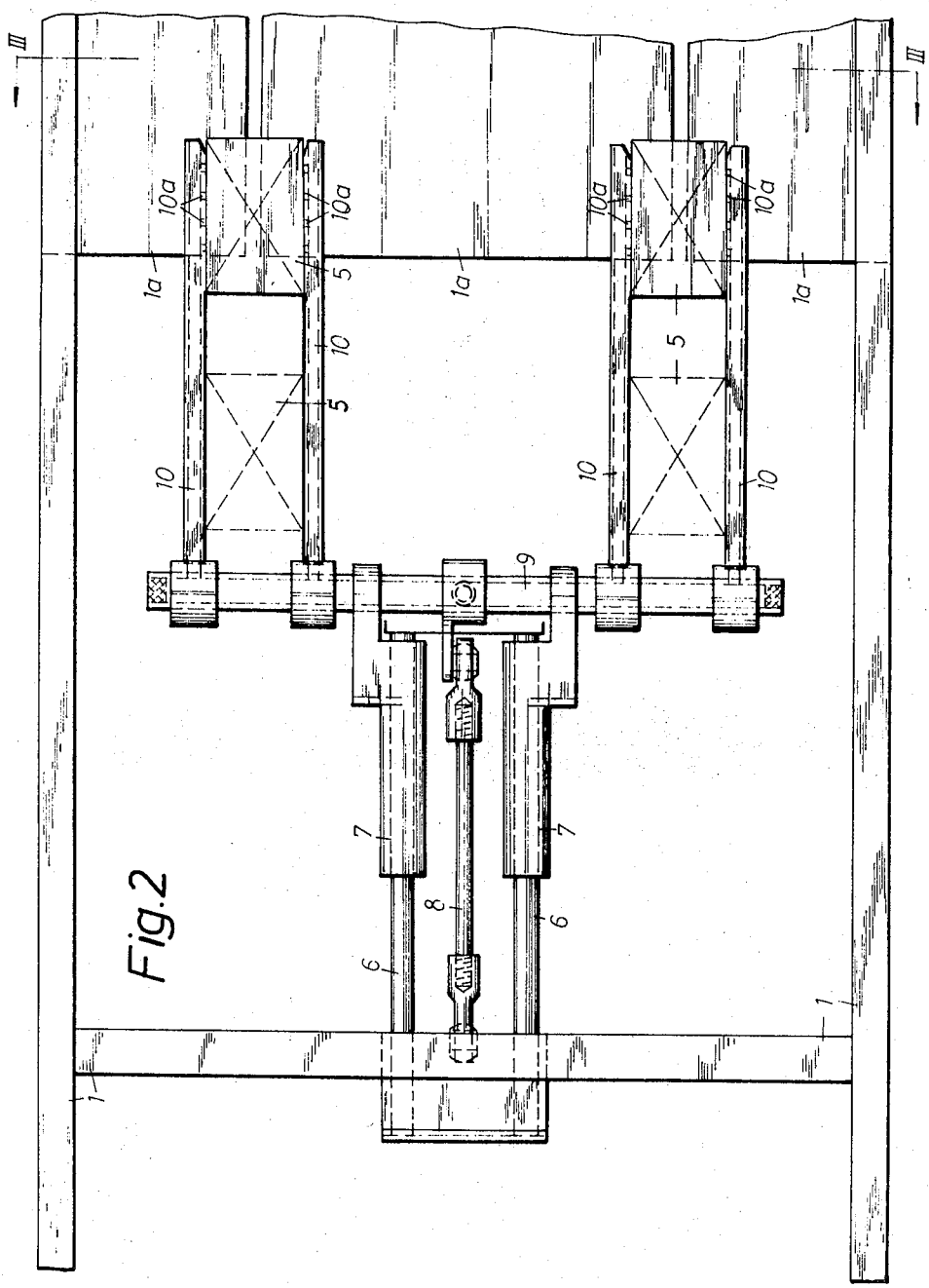

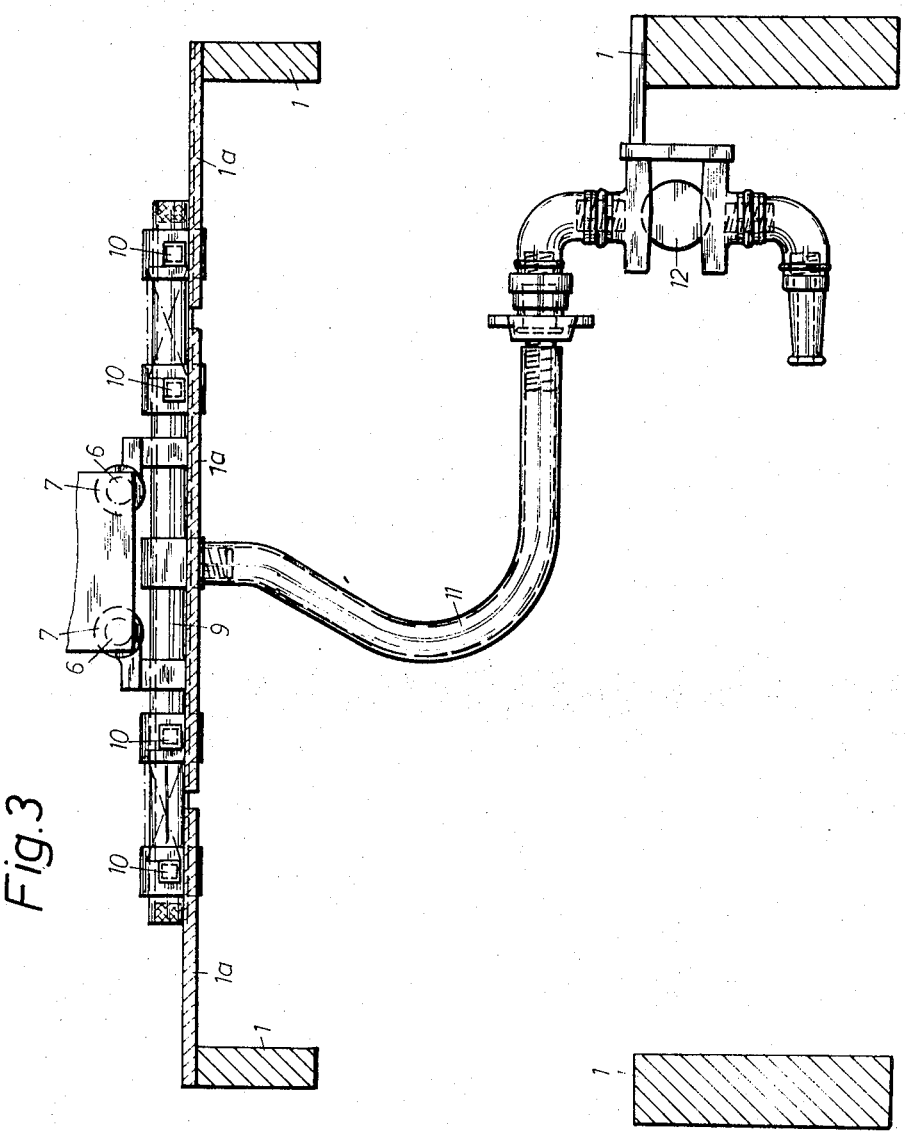

APPARATUS FOR WITHDRAWING PACKAGES FROM A CONTINUOUSLY CIRCULATING CONVEYOR CHAIN

The invention relates to a device for removing packages of soft material and enclosing articles which are easily crushed, from a constantly travelling conveyor chain provided with driver hooks.

According to heretofore known devices of this type, the removal of the packages from the driver hooks of the conveyor chain takes place in different ways. In one device, the packages are removed from the chain hooks by driven rollers the peripheral speed of which is greater than the speed of the chain. This device has the disadvantage that the packages are exposed to a certain pressure, which is very high for a reliable removal. Another device in which the packages are removed from the chain hooks at increased speed by means of fingers acting from both sides, is only suitable for packages for compact articles, which can be subjected to any desired pressure load and impact stress. Since the present invention, however, is primarily concerned with packages which consist of soft material and which enclose easily crushable articles, such as cigarettes, paper handkerchiefs or textiles, the above-mentioned heretofore known devices are not suitable.

It is also known for removing partially covered packages from the chain hooks of the conveyor chain, to arrange a discharge bin open at both ends into which the packages are pushed from the chain hook and which is subsequently moved on at increased speed from the chain hooks, the packages being carried along by pressing bars.

The arrangement of this known discharge bin has the drawback that the bin must be moved within short periods of time between the cycles of movement of other machine parts, which serve, for example, for folding or for the further conveyance of the packages. Due to the said short periods of time, high accelerations and high speeds are necessary for the movement of the discharge bin. These high accelerations unfavorably affect the desire of increasing the working speed of the packaging machine, particularly since, due to said high accelerations, the frictional forces increase, which are necessary for carrying along the packages by means of the discharge bin when said packages are removed from the conveyor chain. When these frictional forces, which are applied by pressing bars laterally onto the packages, are increased, the soft packages will change their shape, which can lead not only to damaging of the articles in the completed or partially completed packages, for example cigarettes, but with packages which are not yet completed, could make any accurate subsequent processing impossible in that the occasional or permanent deformations result in incorrect folding processes. This can occur, for example, in the packing of paper handkerchiefs or textiles.

It is, therefore, an object of the invention to provide a device of the above-mentioned general type which will overcome the above-mentioned drawbacks.

It is another object of this invention to provide a device for removing packages of soft material for easily crushable articles, from a travelling conveyor chain provided with driver hooks, by means of a withdrawing component which can be moved independently of any other part of the packaging machine and which will exert a sufficiently large frictional force on the packages to be removed from the driver hooks even with high-speed machines, without unduly deforming the packages consisting of soft material.

These objects have been realized according to the invention by the fact that the withdrawing component includes two section tubes arranged in a fork-shaped manner with suction holes directed toward the package, said tubes being spaced from each other by a distance corresponding to the width of a package, and being secured to a support tube which by means of guide sleeves is movably mounted on guide rods by means of a pull-rod.

According to a further feature of the invention, the suction pipes have more than twice the length of the respective package, and the suction holes are arranged at the free end of the suction pipes over a range corresponding to the length of the package.

This construction according to the invention of the discharge component results in a removal process which protects the package and the packed articles, and which can be carried out independently of the movement cycles of other machine parts. The shape of the removing component also allows processing of the package during the movement. Thus, for example, the open side of the package to which the hook was applied, can be folded so that it is complete. In addition, it is possible to convey the package directly from the removal component by means of a pusher plate into a stacking tower arranged above or below the transport chain.

In addition, with packaging machines with several tracks it is suggested according to the invention, to arrange the suction pipes of all the tracks on one support tube and to connect the support tube by means of a hose to a control valve through which the suction is controlled corresponding to the rhythm or cycle of the packaging machine.

The invention is illustrated by way of example in the accompanying drawings, in which:

FIG. 1 is a side view of a part of a packaging machine with the removing device according to the invention, in which for the sake of clearness all those machine parts are omitted which are not necessary for an understanding of the device according to the invention;

FIG. 2 is a plan view of the removing device according to FIG. 1;

FIG. 3 is a section taken along the line III–III of FIG. 2.

The articles which are to be packed, for example cigarettes wrapped in tinfoil, are conveyed by a continuously travelling conveyor chain 2, which is provided with catching or driver hooks 2a. These hooks 2a engage the rear side of the package 5 and push the latter over a conveyor plate 1a, the hook 2a projecting through a slot in this conveyor plate 1a. The conveyor chain 2 runs over chain wheels 3 and 4 mounted on the frame 1 of the packaging machine.

In the position shown in FIG. 1, the package 5 is taken over by two suction pipes 10 arranged alongside said package, and having their ends provided with suction holes 10a. The suction pipes 10 are attached to a support tube 9, which is moved to and fro by a pull-rod 8. The support tube 9 is guided by means of two guide sleeves 7 on horizontal guide rods 6.

The speed at which the suction pipe 10 is moved from the right-hand position shown in FIG. 1 to the left-hand position which is not shown, is greater than the speed of travel of the conveyor chain 3 so that during this movement the package 5 which is held by the suction is removed from the respective hook 2a. The reciprocating movement of the suction pipe 10 is produced, for example, by means of a rocking lever, as is shown in FIG. 1.

When the package 5 is held fast, its shape is only slightly altered since the suction pipes 10, in a fork-shaped arrangement, are arranged at a distance from each other which corresponds to the width of the packages 5. In this way, even with high suction forces, no undesirable deformation of the package 5 occurs which could damage the contents or deform the package 5 or could interfere with subsequent processing operations. It is thus possible, by means of a high suction force to produce friction between the package 5 and the suction pipes 10, which even in high-speed machines with high accelerations will guarantee a reliable holding of the package 5 when the latter is being removed from the hooks 2a.

In the left-hand end position of the suction pipe 10 the package 5 strikes against a stop. At the same time the suction is stopped so that the suction pipe 10 can be returned to its right-hand end position. Due to the fork-shaped design and the length of the suction pipes 10, the deposited package 5 can be conveyed further during the return movement of the suction pipe 10. This may be effected, for example, according to FIG. 1, by means of a pushed plate 14 attached to a push-rod 15, which pushed the package 5 into a stacking tower 13 located above the conveyor plate 1a.

During the removal of the package 5 from the hook 2a, the folding process for the open side of the package 5 against which the hook 2a was previously bearing can be undertaken at the same time. This folding may be effected in any known or standard manner so that the components necessary for this operation are omitted from the drawings for the sake of clearness.

The control of the suction occurs by means of a control valve 12, which is rigidly attached to the frame 1 and is connected to the support tube 9 by a flexible hose 11, as is shown in FIG. 3.

The arrangement is such that when the package reaches the area of the stacking tower 13, for instance, an electric contact is closed which shifts the valve 12 so as to permit air to enter the suction pipe 10 to eliminate the suction effected therein and to permit the push rod 15 and tray 14 to push a package into the stacking tower 13. When the suction pipes 10 again leave the area of the tower 13 to move toward the conveyor, the electric contact referred to above is opened, and valve 12 is adjusted for creating a vacuum in suction pipe 10.

In the drawings a two-track machine is illustrated (especially FIGS. 2 and 3) in order to show that with multitrack machines only one control valve 12 and one flexible hose 11 need be provided, if the forklike suction pipes 10 are jointly attached to one support tube 9.

It is, or course, to be understood, that the present invention is, by no means, limited to the specific arrangement shown in the drawings, and that numerous modifications are possible, the scope of the invention being determined by the disclosure.

I claim:

1. An apparatus for withdrawing packages in motion which consist of soft material and contain easily deformed articles, which includes: conveyor means movable at a first speed and comprising a conveying path for receiving and conveying packages of soft material, dual bifurcated pipe means arranged adjacent to said conveying path and provided at free ends with suction holes facing toward said conveying path for suction holding a package adjacent to said suction holes, and means operable to reciprocate said suction pipe means and to move the same away from said conveyor means at a second speed higher that said first speed, each of said dual bifurcated pipe means comprising two pipes, each pipe being arranged on a respective side of and adjacent to said conveying path and having its suction holes extending longitudinally of the conveyor path and facing toward the holes of the other pipe while being spaced from the holes of the other pipe by a distance corresponding approximately to the width of the package to be suction held therebetween.

2. An apparatus according to claim 1, in which each of said dual bifurcated pipe means has a length equaling at least twice the corresponding length of a package to be engaged by said pipe means, and in which said suction holes are provided longitudinally at that free end of said pipe means which is closest to said conveyor means and extend over a length corresponding to the length of a package to be engaged by said pipe means.

3. An apparatus according to claim 1, which includes at least two spaced pairs of spaced pipes drivingly connected to each other, reciprocating means common to and drivingly connected to said pairs of dual bifurcated pipe means, and control valve means common to all of said pipe means collectively for controlling the plural path air pressure therein.